ELECTRONIC FOCUSED PROCESSOR

Filed Jan. 31, 1967 4 Sheets-Sheet 1

INVENTOR
GREGORY L. MARTIN
BY: Oldham & Oldham
ATTORNEYS

INVENTOR
GREGORY L. MARTIN
BY: Oldham & Oldham
ATTORNEYS

INVENTOR
GREGORY L. MARTIN
BY: Oldham & Oldham
ATTORNEYS

INVENTOR
GREGORY L. MARTIN
BY:
Oldham & Oldham
ATTORNEYS

United States Patent Office 3,392,385

Patented July 9, 1968

3,392,385

ELECTRONIC FOCUSED PROCESSOR

Gregory L. Martin, Phoenix, Ariz., assignor to Goodyear Aerospace Corporation, Akron, Ohio, a corporation of Delaware Filed Jan. 31, 1967, Ser. No. 613,026
6 Claims. (Cl. 343—5)

ABSTRACT OF THE DISCLOSURE

An electronic focused processor apparatus adapted to provide a video signal representative of a radar image pattern including means to store a plurality of such video output signals to produce azimuth elements, and including a focusing system to receive a stored video output signal which includes a chirp compression network having delay slope characteristics to focus targets, and which includes a circuitry means to provide multiple looks to increase smoothness and resolution to provide a high resolution display with a minimum delay. The processor of this application is equivalent to optical systems in performance, and superior in terms of delay time since film developing is not necessary. The invention processes signals from a coherent radar to achieve a picture of the terrain scanned by such radar.

Heretofore it has been desirable to process the signals from a coherent radar by optical photography methods to achieve a picture of the terrain scanned by such radar. However, the delay time with these optical processors is considerable since film developing is necessary. An electronic focused processor is needed by the art which is the equivalent to the optical systems in performance, and superior in terms of delay time which will also include attractive features of less weight, less bulk size, and no special handling techniques due to film bath, etc.

Therefore, it is the general object of the present invention to provide an electronic focused processor for radar signals from a coherent airborne radar to provide a high resolution display with a minimum delay.

A further object of the invention is to provide an electronic focused processor where the map signal is available in electronic form, and therefore readout proximity is not restricted.

A further object of the invention is to provide an electronic focused processor wherein all the information processed can be permanently stored on magnetic tape for delayed or future reference readout.

The aforesaid objects of the invention and other objects which will become apparent as the description proceeds are achieved by providing in an electronic focused processor the combination of means to scan a stored radar image signal along a line of azimuth and provide a video output signal representative thereof, means to store the video output signal until there is sufficient information to produce a two dimensional radar image, a high resolution cathode ray tube, means to display the stored video output signal onto the cathode ray tube, and means to permanently store all processed radar image signals.

For a better understanding of the invention reference should be had to the accompanying drawings, wherein.

Figure 1:
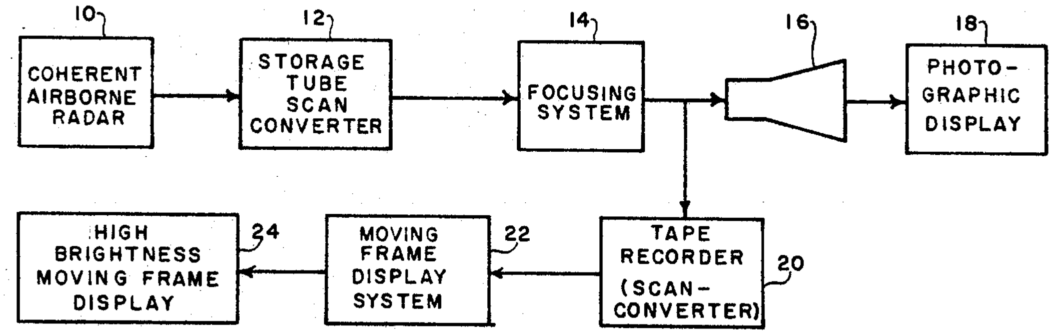
FIG. 1 is a block diagram schematically indicating the functioning elements of the focused processor.

With reference to the block diagram shown in FIG. 1, the numeral 10 indicates generally a coherent airborne radar which scans range only on a specific azimuth in relation to the aircraft in which it is carried. Normally, these in-flight, high resolution, side-looking radars are called SLR's. A typical example of such radar would be an AN/APQ–102 as made by Goodyear Aerospace Corporation. The signal from the radar 10 is sent to a storage tube scan converter 12 which performs essentially the same task as the data film of an optical processor. Video range information from the radar signal is stored until there is sufficient azimuth information to enable focusing of the Doppler signal to produce a single azimuth element. The invention contemplates that a CK–1383 Raytheon dual-gun electrostatic storage tube will meet the objects of the invention and may, for example, provide a sweep of over 400 feet of azimuth, and can represent resolution to within a very few feet. The output of the storage tube 12 is applied to a focusing system 14 which consists basically of a chirp network followed by an A-M detector and video amplifiers, which will be more fully defined and explained. hereinafter. The video signal from the focusing system is swept across a high-resolution cathode ray tube 16 which is optically focused onto a single frame film holder 18. This display will produce a single frame high-resolution photograph of dimensions selected in accordance with the system and equipment parameters.

Since the storage tube 12 will only store information long enough to allow for scan of a limited width determined by system parameters, a tape recorder 20 is used for the permanent record. The technique of displaying a large radar image on a CRT display system 22 is also accomplished by use of the tape recorder 20.

A high brightness moving scene display 24 is provided that will show a scene approximately 3 miles in range and 2 miles in azimuth. This display may have for example a 12 inch picture tube allowing several observers to view the moving frame display at one time, at relatively high ambient light levels.

*Storage tube scan-converter*

Figure 2:
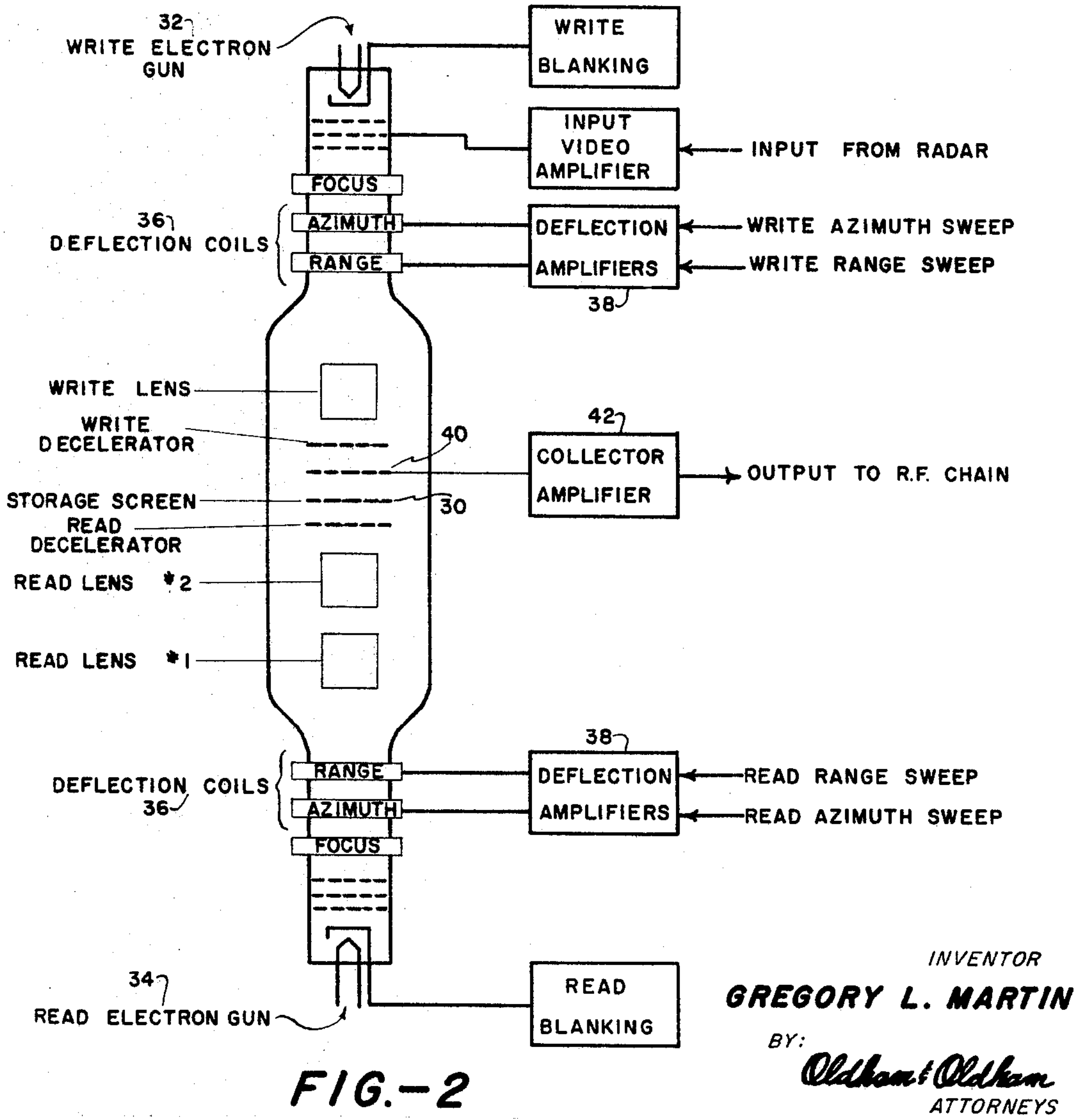
FIG. 2 is an enlarged block diagram and partial schematic illustration of the storage tube scan converter of FIG. 1.

The scan converter, as best shown in FIG. 2, is an electronic tube which utilizes electron write and read guns at opposite ends thereof with a plurality of lenses and storage screens internally of the tube. For more specific description of the tube itself, it should be referred to as a Raytheon CK-1383 storage tube. Other tubes which will electronically write and read optical images would also meet the objects of the invention. In this instance, however, writing is accomplished by bombarding a storage screen 30 with electrons with sufficient velocity to produce a secondary-to-primary emission ratio which is greater than unity. This produces a discreet area of positive charge, which is proportional to the write beam current.

Prior to writing, an erasing procedure prepares the storage screen to receive the writing beam, and is accomplished by sweeping the storage screen 30 with an unmodulated beam from a write electron gun 32. The storage screen potential is kept below the critical value during this period and since the secondary-to-primary emission ratio is less than unity, the dielectric surface can store electrons and become negatively charged to the primary cathode potential. In order to use the write deflection gun 32, such gun must be at the potential of a read cathode during priming and negative by 400 volts when it is used for writing on the storage screen 30. To accomplish this change in voltage the write gun 32 and read gun 34 are both magnetically focused and deflected by utilizing coils, all indicated generally by numeral 36. Deflection amplifiers 38 utilizing read and write sweeps for range and azimuth are provided to drive the deflection coils 36. The other elements of both electron guns are connected to the proper voltages for accelerating, collimating, and providing deceleration of both read and write beams before they strike the storage screen 30.

*Sweep process*

Figure 7A:
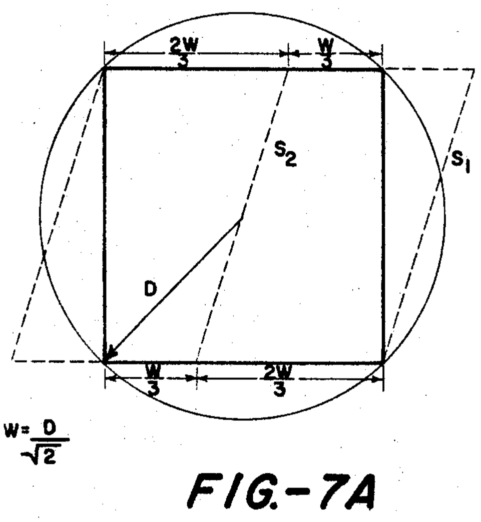
FIGS. 7A and 7B are schematic illustrations of the storage screen write raster pattern to achieve the proper image showing.
Figure 7B:
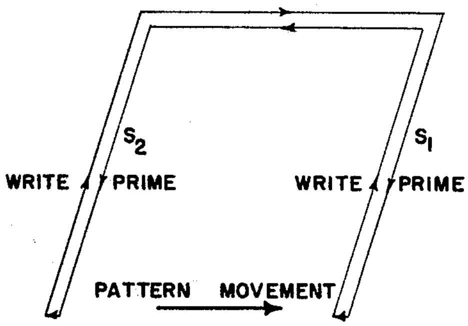
Figure 8A:
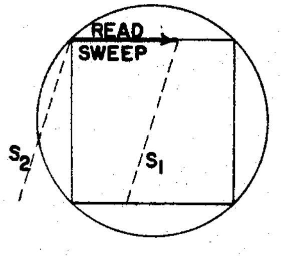
FIGS. 8A through 8F schematically illustrate the read sweep progression pattern utilized to readout the material written in with the pattern of FIGS. 7A and 7B.
Figure 8B:
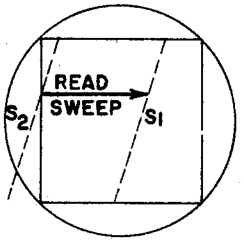
Figure 8C:
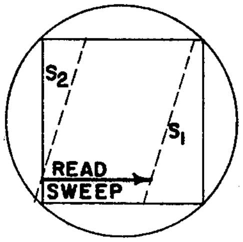
Figure 8D:
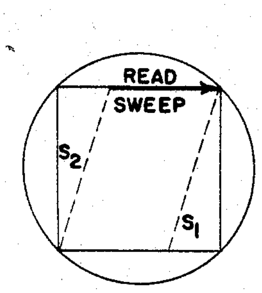
Figure 8E:
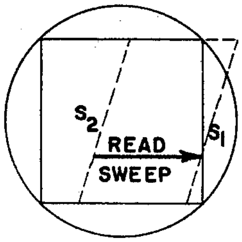
Figure 8F:
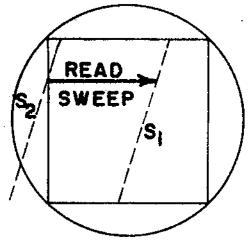

It is the sweep process which makes it possible to utilize a single scan converter tube to effect a readout continuously and provide a visible image thereof. During the sweep process the entire inscribed square of the storage screen 30 is utilized. Specific reference should be had to FIGS. 7A and 7B to understand this process. The particular sweep pattern used is shown in FIG. 7B. The sweep pattern can easily be followed by starting in the upper right hand corner and moving down the prime sweep of $S_1$; at the bottom the voltage is dropped by 400 volts on the storage screen and the sweep starts up the right sweep of $S_1$, and at the top the voltage is increased by 400 volts as the sweep moves across the screen to start down the prime portion of $S_2$. This pattern continues right on around in a continuous pattern as shown. While this sweep pattern is being formed, it is also being moved steadily to the right in order to accommodate the azimuth scan readout.

The azimuth scan readout can be better understood by following the sequence of FIG. 8, which depicts both the write and read sweeps, but does not include the priming mode of the write sweep. In FIG. 8A, the top of $S_1$ and $S_2$ are in the left two-thirds of the inscribed square representing the storage screen 30, and the readout sweep is between them, and moving downward. In FIG. 8B, $S_1$ and $S_2$ have moved to the right and the readout sweep has moved downward. In sketch 8C, $S_2$ is almost entirely on the inscribed square, and the readout sweep is nearly at the bottom of the square, and is still maintained within the left two-thirds of the inscribed square. In sketch 8D, both $S_1$ and $S_2$ are entirely within the square and the readout sweep has just switched from the lower left two-thirds to the upper right two-thirds of the inscribed square. In sketch 8E, $S_1$ has moved off the square and the readout sweep has moved down the right two-thirds of the square. Sketch 8F shows the pattern after the readout sweep has reached the bottom and retraced to the upper left two thirds of the inscribed square. Note, the readout trace is now bounded on the right by $S_2$ and on the left by $S_1$.

The electron beam which produces the complete readout pattern produced by this over-all read process has portions which are able to penetrate the storage screen and become low-level signals which are captured on the collector 40, amplified, and sent on to the focusing system 14, which will be described next.

*Focusing system*

Figure 3:
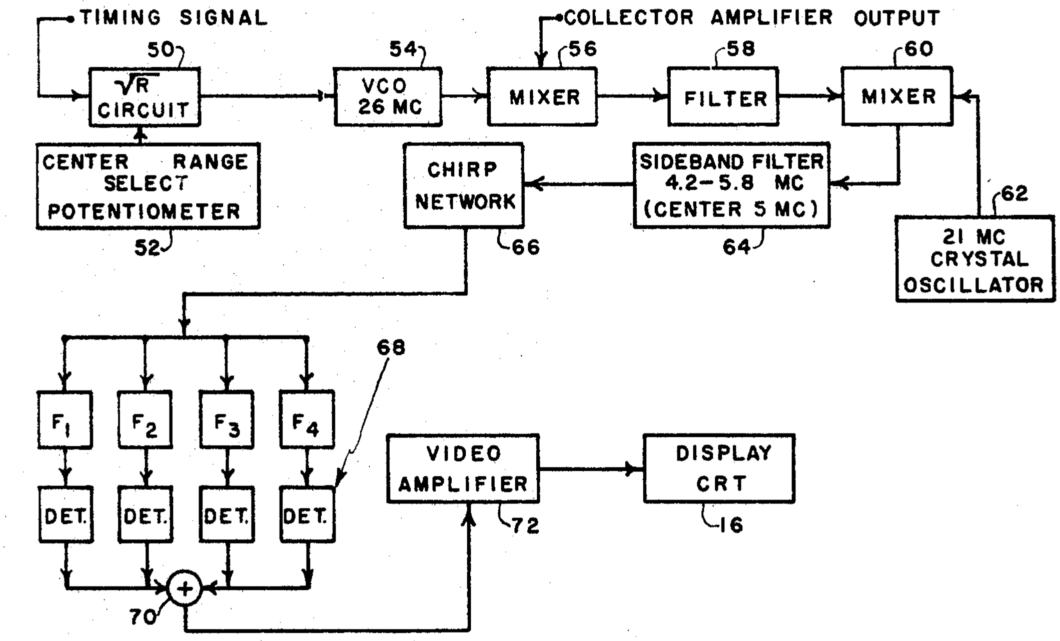
FIG. 3 is a block diagram of the chirp network used in the focusing system.

The focusing system 14 is best shown in FIG. 3 of the drawings. This circuit causes the target signal histories which are dispersed in azimuth when they are read out of the storage tube to be compressed or focused into a high resolution signal. A square root of range correction must be added to this system in order to maintain a constant rate of frequency change with range so that proper focus can be achieved on all range readouts. A center range potentiometer is provided to correct the circuit for the range being mapped. This is indicated by numeral 52.

The composite DC voltage signal from circuit 50 is applied to a 26 megacycle voltage-controlled oscillator 54 whose output is then mixed with the output from the collector amplifier 42 in a mixer 56. The mixing is done at this point to provide easier filtering. The signal is now filtered with a relatively wide band filter 58, and then it is mixed in mixer 60 with the signal from a 21 megacycle crystal oscillator 62.

A sideband filter 64 selects the difference frequency and applies it to a chirp network 66. The chirp compression network 66 has characteristics that delay the higher frequencies longer than it does the lower ones. The delay slope characteristics of the chirp network may be any desired value, but for the particular frequencies disclosed herein, it is 21 microseconds per megacycle.

The signal from the chirp network 66 is sent to four relatively narrow band filters labled F1 through F4 which form the means for obtaining a "multiple-look" aspect to the system. The output of these filters is supplied to four conventional A-M detectors, indicated generally by numeral 68, whose outputs are sent to a summer 70 and supplied through a radio amplifier 72 to the display CRT 16.

The "multiple-look" technique employed in this system because of the compression provided by the chirp network 66 serves as a focusing or Doppler beam-sharpening technique which is used in high-resolution radar system. In effect, four narrow band looks are achieved by chirping the entire F-M signal from sideband filter 64 and then filtering the output with the four 400 kc. band width filters. Each filter output is detected and summed into a composite video which is then amplified with sufficient amplitude to intensity modulate a conventional CRT. This technique accomplishes a "multiple-look" with one chirp network rather than with one for each filter.

*Single frame photographic display*

The output of the focusing system is applied to the Z axis of a high resolution CRT 16 with the same type of magnetic deflections that is employed in the storage tube scan converter 12. The CRT is imaged by any suitable lens onto a photographic film plane in the photographic display 18, and can employ either single frame "Polaroid" type film or any other suitable high-resolution camera film. With the high-resolution type film the system disclosed is capable of resolving the total number of readout scans which form one of the passes of the read beam across the inscribed square on the storage screen 30, and therefore will not limit the system's high-resolution capabilities.

*Electronic processing with range offset*

In order to achieve more efficient use of the limited storage area in an electronstatic storage tube, such as the scan converter 14 described above, it may be desirable to avoid the high azimuth offset frequency in the scanning or sweep progression technique described with reference to FIGS. 6 and 7 above. To this end, a circuit such as indicated in FIG. 4 of the drawings may replace the focusing system 14 of FIG. 1.

Figure 4:
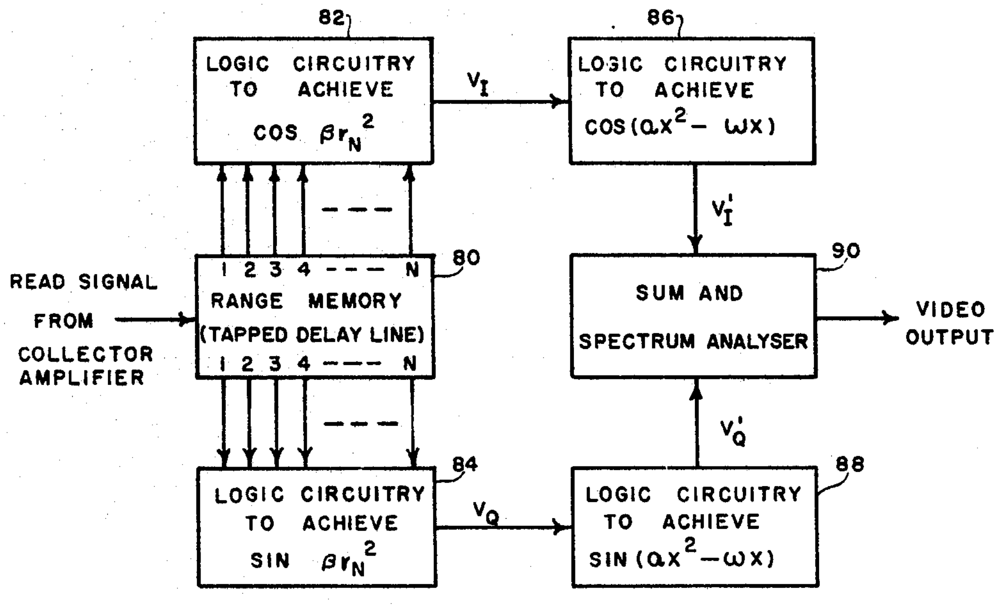
FIG. 4 is a block diagram and partial schematic illustration of electronic processing with range offset which might be used as a component modification of the basic diagram of FIG. 1.

The block diagram of FIG. 4 illustrates that the read signal from the collector amplifier 42 of the scan converter is sent into a range memory 80. The memory 80 can take the form of a simple magneto-strictive delay line which may be readily tapped as desired. Such a delay line is sold by Andersen Laboratories of West Hartford, Connecticut. The data stored in the memory is multiplied by inphase and quadrature range reference functions indicated by blocks 82 and 84 where data is determined from the frequency modulation rate of the range dispersed pulse, and *r* is the range coordinate on the screen 30. The output of blocks 82 and 84 are $V_I$ and $V_Q$, respectively, which represent the inphase and quadrature components of the compressed range pulse. These signals are then sent into circuits 86 and 88 where further mathematical calculations are carried on by suitable logic circuitry to obtain signals $V_I^1$ and $V_Q^1$ prime which represent the inphase and quadrature signal components of all targets which are at a given range. These signals are sent to a sum and spectrum analysis circuit 90 from which emerges the video output signal to drive CRT 16. The constant $\omega$ (omega) is included in circuitry 86 and 88 so that the signal will appear on a carrier wave form. In any event, the circuitry of FIG. 4 achieves a much greater use of the storage area since the azimuth sweep rate and length is vastly reduced, which also eases writing and erasing current requirements thus resulting in improved tube performance.

*Tape recorder scan converter*

Figure 5:
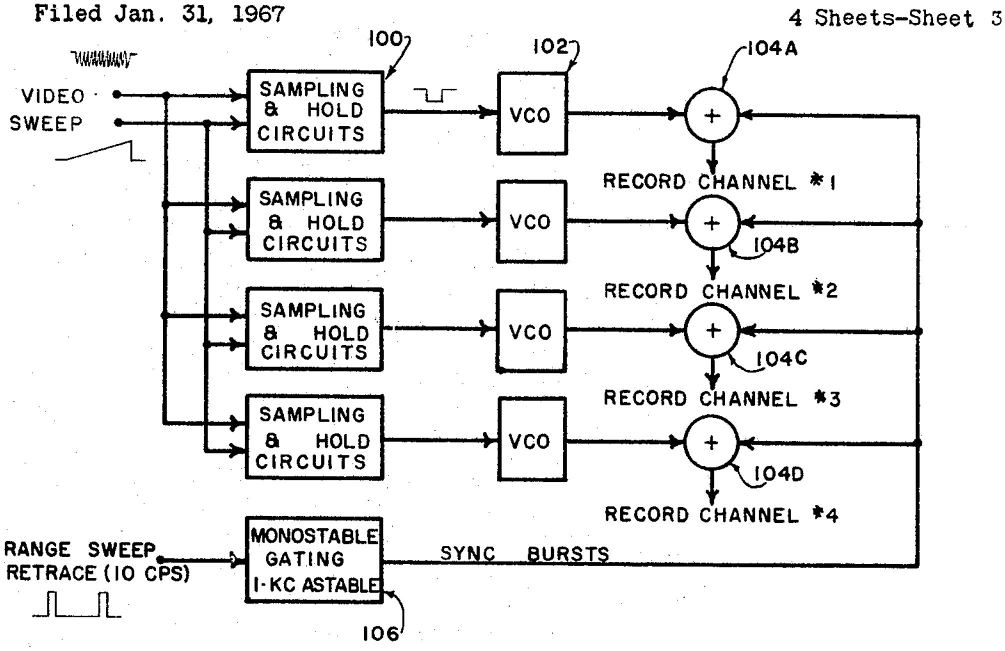
FIG. 5 is a block diagram of the tape recorder scan converter of FIG. 1.

A block diagram of this subsystem is shown in FIG. 5. A set of four sampling and hold circuits 100 sample the same video signal voltage that is used to display one azimuth line in the photographic display. As these four circuits change state, they fire four blocking oscillators that in turn close four analog switches which sample the video produced by the processor. These video samples are each held in a capacitor until the next display ramp causes a new set of samples to be taken. This technique of sampling and holding is referred to in the art as "box-carring" and serves to utilize the dead time between samples for converting the wideband video to narrow band video which can then be recorded and stored on the tape recorder. The box-carred video is applied to four voltage-controlled oscillators 102 which generate the F-M signal that is to be recorded on the four channels 104 A, B, C, and D of the tape recorder. A range synchronization may be provided by utilizing a one kilocycle monostable gating astable 106 to provide synchronization bursts to each record channel.

Figure 6:
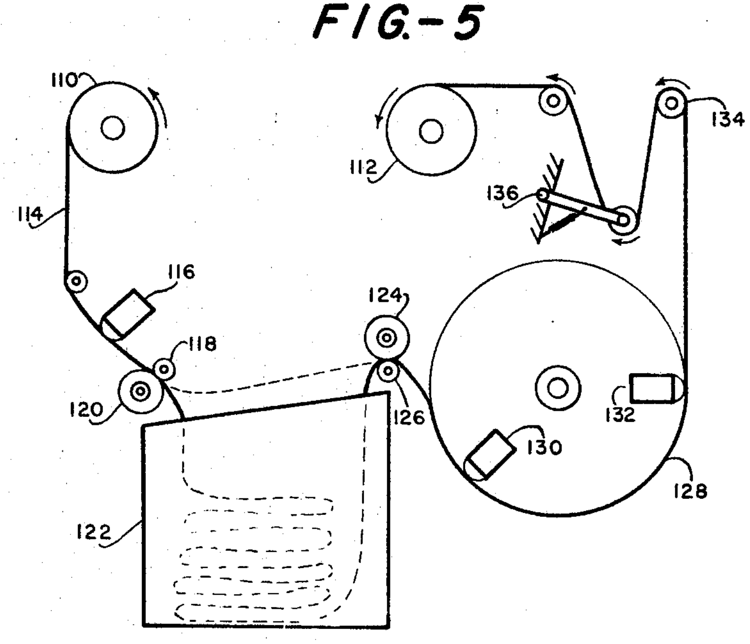
FIG. 6 is an enlarged schematic of the actual structure of the tape recorder utilized to achieve a passing or fixed scene readout and permanent storage.

FIG. 6 rather clearly illustrates the actual structure of the tape recorder, which includes a supply reel 110 and a takeup reel 112, each selectively driven in proper direction by appropriate motorized means. The magnetic tape 114 leads from supply reel 110 and past the recording head 116 and then between a drive capstan 118 and the drive pressure roller 120 before passing into a tape slack bin 122, which serves to provide delayed characteristics as more fully explained hereinafter. The tape passing out of the slack bin passes between the bight of a slack bin retrieval roller 124 and an idler roller 126, and from there around a playback wheel 128 wherein playback heads 130 and 132 are mounted to contact the tape as it moves around the playback wheel. A loop is formed in the tape as it passes around an idler roller 134 and a tension sensing arm 136 before being wound onto the takeup reel 112. Suitable means are provided to rotatably drive the playback wheel 128 at a sufficiently high rate so that the resulting image which is displayed on a cathode ray tube does not appear to flicker. The use of the tape recorder allows reviewing a scene by rendering it stationary without losing new signals since with the use of a slack loop in the bin 122, new data can be recorded while viewing a fixed scene.

*Summary*

Thus, it is seen, that the basic purpose of providing an electronic focusing processor superior to optical type processors in terms of a delay time, and at least the equivalent in resolution has been provided wherein the unit has a light weight, small bulk size, and requires no special handling techniques. A dual writing raster is employed in order to achieve a continuous mapping with a fixed, bounded storage area. This technique allows a continuous read-out of information as though the signal were recorded on a long strip. A focusing system which includes a chirp compression network having the proper delay slope characteristics to focus targets and to provide multiple looks to increase smoothness and resolution depending upon data quality, sweep linearity, and network quality is also provided wherein a plurality of narrow band looks are achieved by chirping the entire F-M signal and then filtering the output with suitable bandwidth filters. The invention also contemplates recording the processed data on magnetic tape so that a passing scene or stationary display can be permanently provided which incorporates the use of a slack loop whereby new data can be recorded while viewing a fixed or passing scene. Further, in order to achieve more efficient use of the limited storage area elimination of a large azimuth offset frequency in combination with a minimum range offset frequency provides the potential of processing much more data.

In accordance with the Patent Statutes, only one best known embodiment of the invention has been illustrated and described in detail, but the inventive scope is to be defined in the appended claims.

What is claimed is:

1. In an electronic focused processor the combination of means to store a radar image pattern, means to scan the stored radar image pattern along the line of azimuth and provide a video output signal representative thereof, means to store a plurality of such video output signals to provide information when such signals are combined to produce azimuth elements, a high resolution cathode ray tube, a focusing system receiving stored video output signals, a chirp compression network having delay slop characteristics to focus azimuth elements onto the cathode ray tube, an electronic image storage tube having a fixed area storage grid, means to control the writing raster onto the grid to form a geometric pattern of an appropriately spaced dual raster, and means to provide a continuous write-in-taken on one part of the grid, and a continuous readout taken on another part of the grid to give the effect that the radar image pattern is being continuously recorded, and means to permanently store all azimuth elements.

2. A processor according to claim 1 wherein the circuitry of the chirp compression network includes means to chirp the entire video output signal, and a plurality of bandwidth filters to filter the chirp output at selected bandwidths, means to detect the output of each filter independently and sum them together into a composite video signal, and means to amplify the composite video signal and intensity modulate the cathode ray tube with the amplified video signal.

3. A processor according to claim 2 where the means to permanently store is a magnetic tape recorder which includes a number of recording heads.

4. A processor according to claim 3 where the tape recorder includes means to achieve a slack loop whereby new data can be recorded and stored in the slack loop while another portion of the tape can be read out.

5. A processor according to claim 1 where the means to focus the stored video output signal onto the cathode ray tube includes means to read the data from the storage means with a fast azimuth scan and a slow range scan, means to multiply and couple the read signals in phase and quadrature range reference functions to produce a resulting signal representing an azimuth reference function, means to sum these resulting signals, means to pass the summed signals through a spectrum analyzer so that the output of the analyzer represents final target data which has been compressed in both azimuth and range.

6. An electronic processor according to claim 1 wherein the focusing system includes a range memory, means to multiply the data in the memory by inphase and quadrature range reference functions to produce inphase and quadrature signal components of all targets which are at a given range, a sum and spectrum analysis circuit driven by the inphase and quadrature signals to produce a video output signal to drive the cathode ray tube.

References Cited

UNITED STATES PATENTS

| | | | |
|---|---|---|---|
| 2,979,714 | 4/1961 | Wallace | 343—55 |
| 3,121,868 | 2/1964 | Hausz et al. | 343—5 |
| 3,146,441 | 8/1964 | Miller | 343—5 |
| 3,200,196 | 8/1965 | Jenkins | 178—6.8 |

RODNEY D. BENNETT, *Primary Examiner.*

C. L. WHITHAM, *Assistant Examiner.*